United States Patent
Zadka et al.

(10) Patent No.: US 9,614,782 B2
(45) Date of Patent: Apr. 4, 2017

(54) CONTINUOUS RESOURCE POOL BALANCING

(71) Applicant: Facebook, Inc., Menlo Park, CA (US)

(72) Inventors: Moshe Zadka, Belmont, CA (US);
Wonho Kim, Sunnyvale, CA (US);
Elliott Sims, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 237 days.

(21) Appl. No.: 14/581,397

(22) Filed: Dec. 23, 2014

(65) Prior Publication Data
US 2016/0182399 A1    Jun. 23, 2016

(51) Int. Cl.
*G06F 15/173* (2006.01)
*H04L 12/911* (2013.01)

(52) U.S. Cl.
CPC .......... *H04L 47/783* (2013.01); *H04L 47/726* (2013.01)

(58) Field of Classification Search
CPC .................................................. H04L 29/0827
See application file for complete search history.

(56) References Cited

U.S. PATENT DOCUMENTS

| | | | | |
|---|---|---|---|---|
| 2003/0069974 A1* | 4/2003 | Lu | ........................... | G06F 9/505 709/226 |
| 2003/0086536 A1* | 5/2003 | Salzberg | ................. | H04M 3/22 379/15.02 |
| 2005/0160133 A1* | 7/2005 | Greenlee | ................. | G06F 9/505 709/200 |
| 2009/0172666 A1* | 7/2009 | Yahalom | ............... | G06F 3/0605 718/1 |
| 2010/0115496 A1* | 5/2010 | Amichai | ............. | G06F 11/3688 717/135 |

* cited by examiner

*Primary Examiner* — Vivek Srivastava
*Assistant Examiner* — Nicholas Celani
(74) *Attorney, Agent, or Firm* — Perkins Coie LLP

(57) ABSTRACT

The disclosure is related to balancing resources between pools of servers, e.g., by moving servers from a first pool of servers to a second pool of servers. The first pool executes a first version of an application, e.g., a desktop version, and the second pool executes a second version of the application, e.g., a mobile version. The technology moves a number of servers from an "OK" pool to a "not OK" pool. A "not OK" pool is a pool whose performance metric, e.g., response latency of a server, does not satisfy a criterion, and an "OK" pool is a pool whose performance metric satisfies the criterion even if the number of servers are removed from the pool. The number of servers to be moved is determined as a function of the increase in load which the pool can withstand by remaining in OK state even after the servers are removed.

15 Claims, 13 Drawing Sheets

CONTINUOUS RESOURCE POOL BALANCING

BACKGROUND

Data processing systems with distributed architectures have become increasingly popular, particularly following the widespread diffusion of the Internet. In a distributed architecture, client computers consume services offered by server computers across a network. Two or more servers can be grouped into a cluster, so as to appear as a single computer to the clients. The cluster provides a single point of management and facilitates the scaling of the system to meet increasing demand. There are various clustering techniques that facilitate clustering of servers. One such clustering technique is the load-balancing model.

The load-balancing attempts to optimize the distribution of workload across the servers. Particularly, in a cluster of the network load balancing type incoming requests from clients can be distributed across servers that share a single (virtual) network address.

In some other clustering techniques, different clusters serve different types of requests, e.g., a first set of servers serves users who access a first version of the application and a second set of servers serves users who access a second version of the application. Load balancing between such clusters is different from the above load balancing solution and is typically more complex, because access requests from clients cannot be distributed between clusters as the clusters serve different types of requests. Current load balancing solutions balance the load between such clusters by moving resources, e.g., servers, between the clusters.

The current load balancing solutions typically use a metric, e.g., central processing unit (CPU) idle time, to move servers from a cluster that has high CPU idle time to a cluster that has low CPU idle time. CPU idle time is the amount of time, e.g., during a measurement time period, during which the CPU is not utilized or has low utilization. However, such load balancing solutions are typically inefficient. One reason why such load balancing solutions are typically inefficient is because in some situations, e.g., when there are memory issues on web servers, the CPU idle may not actually affect the performance of the cluster. While there are memory issues in the server, the CPU idle may look acceptable and therefore, the load balancing solution may let the server be moved to another cluster, thereby causing the performance of the cluster to deteriorate from bad to worse. Such load balancing solutions can create an imbalance rather than balance in the resource utilization in the distributed system.

DETAILED DESCRIPTION

Figure 1:
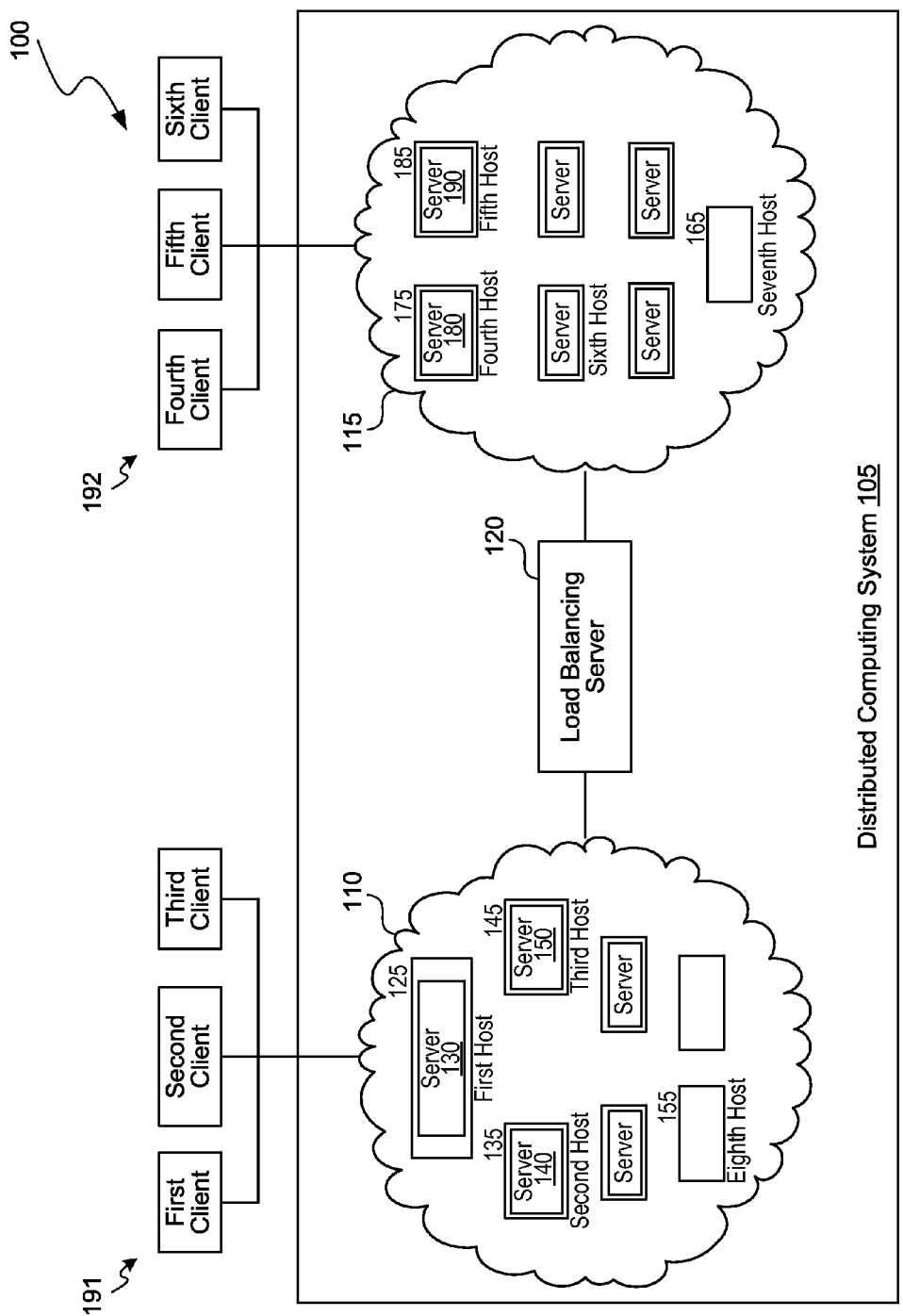
FIG. 1 is a block diagram of an environment in which the load balancing server can be implemented.

Disclosed are embodiments for balancing resources between pools of servers by moving servers, e.g., instances of an application executing at host computing devices ("hosts") in a distributed computing system, from a first pool of servers to a second pool of servers. The first pool of servers can execute a first version of an application and the second pool of servers can execute a second version of the application. For example, the first pool of servers executes a desktop version of a social networking application and the second pool of servers executes a mobile version of the social networking application. The load on the pool of servers can vary, e.g., as the number of users accessing the particular version varies. For example, the number of users accessing the desktop version of the social networking application can be more during the day and the number of users accessing the mobile version can be more during the night. That is, as the day progresses, the load on the desktop version can decrease and the load on the mobile version can increase. The disclosed embodiments include a load balancing server computing device ("load balancing server") that facilitates the balancing of the load on the server pools by moving the servers between the pools, e.g., as a function of the load of the pools.

The load balancing server can move a specified number of servers from an "OK" pool (also referred to as "green pool," "positive state" or "not overloaded pool") to a "not OK" pool (also referred to as "red pool," "negative state" or "overloaded pool"). The load balancing server can identify a pool to be in positive state or negative state based on various factors, e.g., load-dependency. Load-dependency can define a relationship between a load of the server and a performance metric, e.g., response latency ("latency") of the server. If the average performance metric of the servers in the pool satisfies a specified criterion, the pool is said to be in positive state, else in negative state. For example, when the servers are moved from a first pool to a second pool, the load on the remaining servers in the first pool can increase, thereby causing the latency of the pool to increase. However, if the latency does not exceed a specified latency threshold, then the first pool can be determined to be in positive state.

If the second pool is in positive state but the first pool is in negative state, the load balancing server can move a specified number of servers from the second pool to the first pool. If both pools are in the positive state, the load balancing server either may not move any servers or move a specified number of servers from the pool with the highest specified percentile of CPU idle. If both pools are in the negative state, the load balancing server can generate an alert to notify a user, e.g., an administrator of the distributed computing system, that both the pools are in the negative state or overloaded.

The load balancing server can determine the specified number of servers to be moved from a first pool to a second pool in many ways. For example, the load balancing server predicts a response latency of the first pool when the load on the first pool is increased by a specified percentage. If the predicted response latency of the first pool is still below the specified latency threshold, the first pool can be determined to be in positive state, and the specified number of servers to be moved can be determined as a function of the specified percentage, e.g., a mathematical approximation of the specified percentage.

In some embodiments, the mathematical approximation function uses statistical data, which includes information regarding the response latencies of the pool for various values of the load on the pool, for determining the number of servers to be moved from the pool. For example, the load balancing server selects a set of servers in a pool and increments a current load on the set of servers progressively, e.g., until the response latency exceeds the specified latency threshold, and records values of the response latency of the pool for various load values to generate statistical data. The load balancing server can then use the statistical data to determine an appropriate percentage for increasing the load in a pool while still keeping the pool in the positive state, which can then be used to determine the number of servers to be moved.

Turning now to the figures, FIG. 1 is a block diagram of an environment in which the load balancing server can be implemented. The environment 100 includes a distributed computing system 105 in which multiple pools of servers, e.g., a first pool 110 and a second pool 115, are executing. In some embodiments, a server is instance of an application, e.g., a social networking application, that can be accessed by client computing devices ("clients"), e.g., clients 191 and clients 192. A server can be executed on a physical computing device, e.g., a host. For example, a first server 130 is executed at a first host 125, a second server 140 is executed on a second host 135, a third server 150 is executed on a third host 145, a fourth server 180 is executed on a fourth host 175, a fifth server 190 is executed on a fifth host 185. In some embodiments, a pool can include a host that is not executing a server, e.g., eighth host 155 in the first pool 110.

In some embodiments, the first pool 110 executes servers of a first version of the application and the second pool 115 executes a second version of the application. For example, the first version of the application is a desktop version of the social networking application and the second version of the application is a mobile version of the social networking application. The first pool 110 can serve clients, e.g., clients 191, that access the desktop version of the social networking application and the second pool 115 can serve clients, e.g., clients 192, that access the mobile version of the social networking application.

In some embodiments, the clients can access the desktop version of the social networking application via an application on a client, e.g., a web browser. In some embodiments, the clients can access the mobile version of the social networking application via an application of the social networking application ("app") installed at a client.

A client can be a desktop, a laptop, a smartphone, a tablet PC, a wearable device, a computing device integrated with an automobile or any other computing device that is able to access the servers executing the pools. In some embodiments, the clients 191 are desktops. In some embodiments, the clients 192 are portable devices, e.g., a smartphone, a tablet PC, or a wearable device.

The clients, e.g., clients 191 and 192, consume resources in the distributed computing system 105, e.g., servers in the pools, in accessing the social networking application. For example, the clients 191, which access the desktop version of the social networking application, consume the resources in the first pool 110 and the clients 192, which access the mobile version of the social networking application, consume the resources in the second pool 115. In some embodiments, the resource consumption in the pools vary, and at different magnitudes in different pools. For example, the resource consumption in the first pool 110 can be higher in the day, e.g., clients can access the desktop version of the social networking application more during the day, and the resource consumption in the second pool 115 can be higher in the night, e.g., clients can access the mobile version more during the night.

The resources in the pools may have to be balanced accordingly, e.g., to provide the clients access to the social networking application without any significant delay that can affect the user experience. In some embodiments, a load balancing server 120 can facilitate balancing the resources in the distributed computing system 105. The load balancing server 120 can execute on a host (not illustrated). The load balancing server 120 monitors the load on the pools and performs one or more actions to balance the load between the pools, e.g., move one or more servers from one pool to another pool, or generate notifications if one or more pools are overloaded and servers cannot be moved between the pools.

Considering the above example of the resource consumption by clients of the social networking application, the load balancing server 120 can move one or more servers from the first pool 110 to the second pool 115 when the second pool is overloaded (negative state), e.g., during the night. Similarly, the load balancing server 120 can move one or more servers from the second pool 115 to the first pool 110 when the first pool 110 is overloaded, e.g., during the day.

The load balancing server 120 can analyze various factors to determine whether to move one or more servers from one pool to another pool. For example, the load balancing server 120 can monitor the current load of the servers in the pools and determine whether any of the pools is overloaded. In some embodiments, the load balancing server 120 determines that a pool is overloaded if a performance metric of a server and/or the pool does not satisfy a specified criterion, e.g., an average response latency of a server in the pool exceeds a specified latency threshold. If any of the pools is overloaded, the load balancing server 120 then determines if there are any pools that are not overloaded, i.e., a pool that is in positive state. In some embodiments, the load balancing server 120 determines that a pool is in positive state if the performance metric of a server and/or the pool satisfies a specified criterion even if a specified number of servers are moved from the pool, e.g., an average response latency of a server in the pool does not exceed a specified latency threshold even if the specified number of servers are moved from the pool. Additional details with respect to how the load balancing server 120 determines whether a pool is in positive state are described at least in association with FIGS. 3, 4A and 4B.

After the load balancing server 120 identifies a pool that is in positive state, the load balancing server 120 can move the specified number of servers from the positive state pool to another pool that is in negative state. The load balancing server 120 can continue to monitor the load of the pools. In some embodiments, moving a server from one pool to another pool includes terminating the server at a specified host in a pool from which the server is being moved and executing another server at another specified host in the pool to which the server is to be moved. In some embodiments, terminating the server can include terminating the execution of one or more application components that collectively form the server. For example, moving the first server 130 from the first pool 110 to the second pool 115 can include terminating the first server 130, which includes the desktop version of the social networking application, at the first host 125 and executing a server, which includes the mobile version of the social networking application, at a host in the second pool 115, e.g., seventh host 165.

FIGS. 2A, 2B, 2C and 2D, collectively referred to as FIG. 2, is a block diagram illustrating various actions performed by a load balancing server of FIG. 1 to balance resources in a distributed computing system of FIG. 1. Note that FIG. 2 illustrates only two pools of servers. However, the number of pools in the distributed computing system 105 is not limited to two, and can vary. The load balancing server 120 can balance the resources between more than two pools.

Figure 2A:
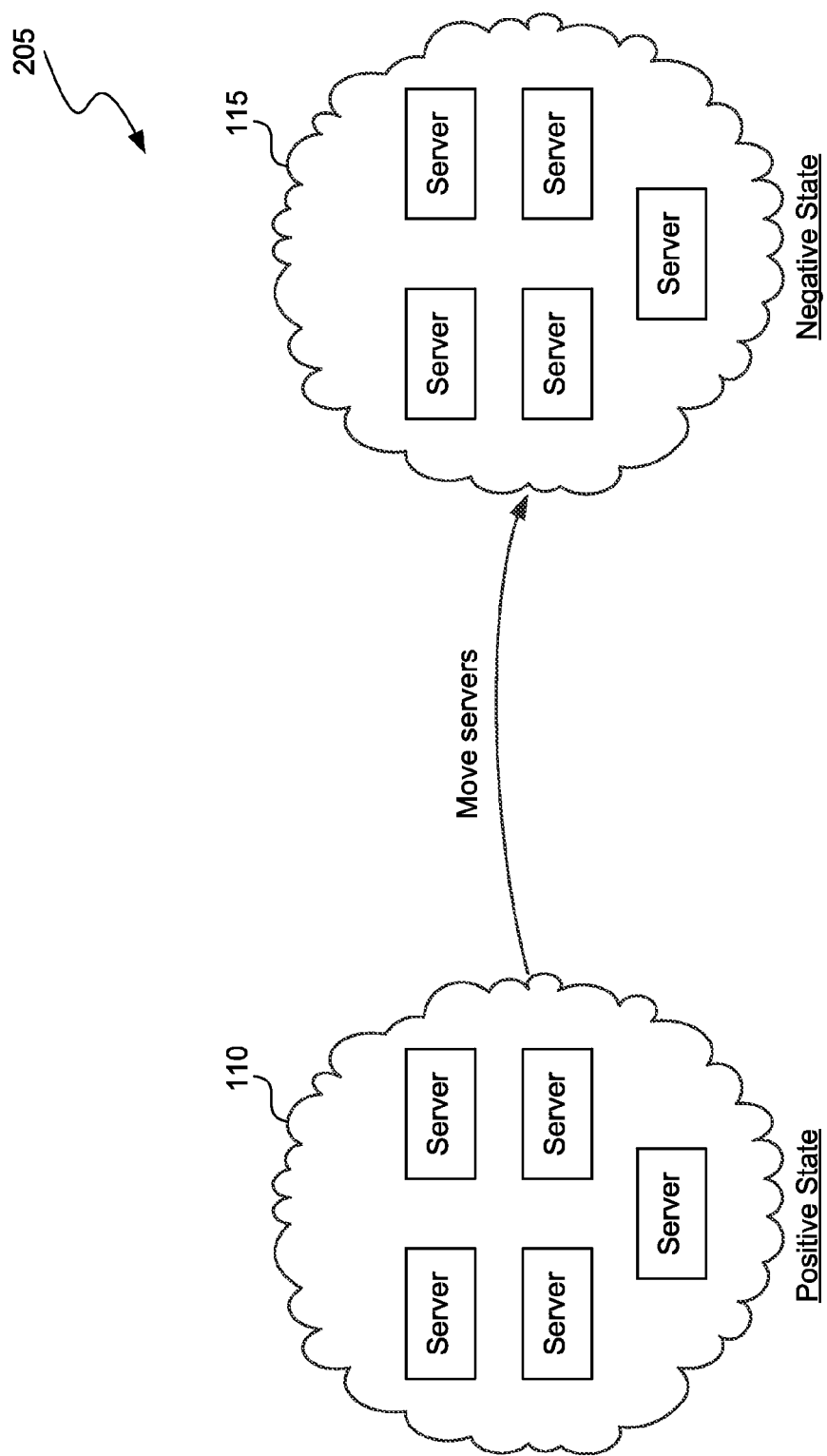
FIG. 2A is a block diagram of an example of moving servers from a first pool to a second pool, consistent with various embodiments.

FIG. 2A is a block diagram of an example 205 of moving servers from the first pool 110 to the second pool 115, consistent with various embodiments. In the example 205, the load balancing server 120 determines that the second pool 115 is in the negative state, e.g., during night when more clients are accessing the mobile version of the social networking application than the desktop version. In some embodiments, the second pool 115 is considered to be in negative state when an average response latency of a server in the second pool 115 exceeds a specified latency threshold. Further, in the example 205, the load balancing server 120 determines that the first pool 110 is in the positive state, e.g., an average response latency of a server in the first pool 110 does not exceed a specified latency threshold even if a specified number of servers are moved from the first pool 110. The load balancing server 120 can then determine to move the specified number of servers from the first pool 110 to the second pool 115. After the servers are moved to the second pool 115, the second pool 115 can switch to a positive state, e.g., the average response latency of a server in the second pool 115 drops to below the specified latency threshold.

Note that if there are more than two pools, e.g., a third pool in addition to the first pool 110 and the second pool 115, a portion of the specified number of servers can be moved from the first pool 110 and another portion of the specified number of servers can be moved from the third pool provided the third pool is also in the positive state. Further, the number of servers moved from each of the positive pools can be equal or different.

Figure 2B:
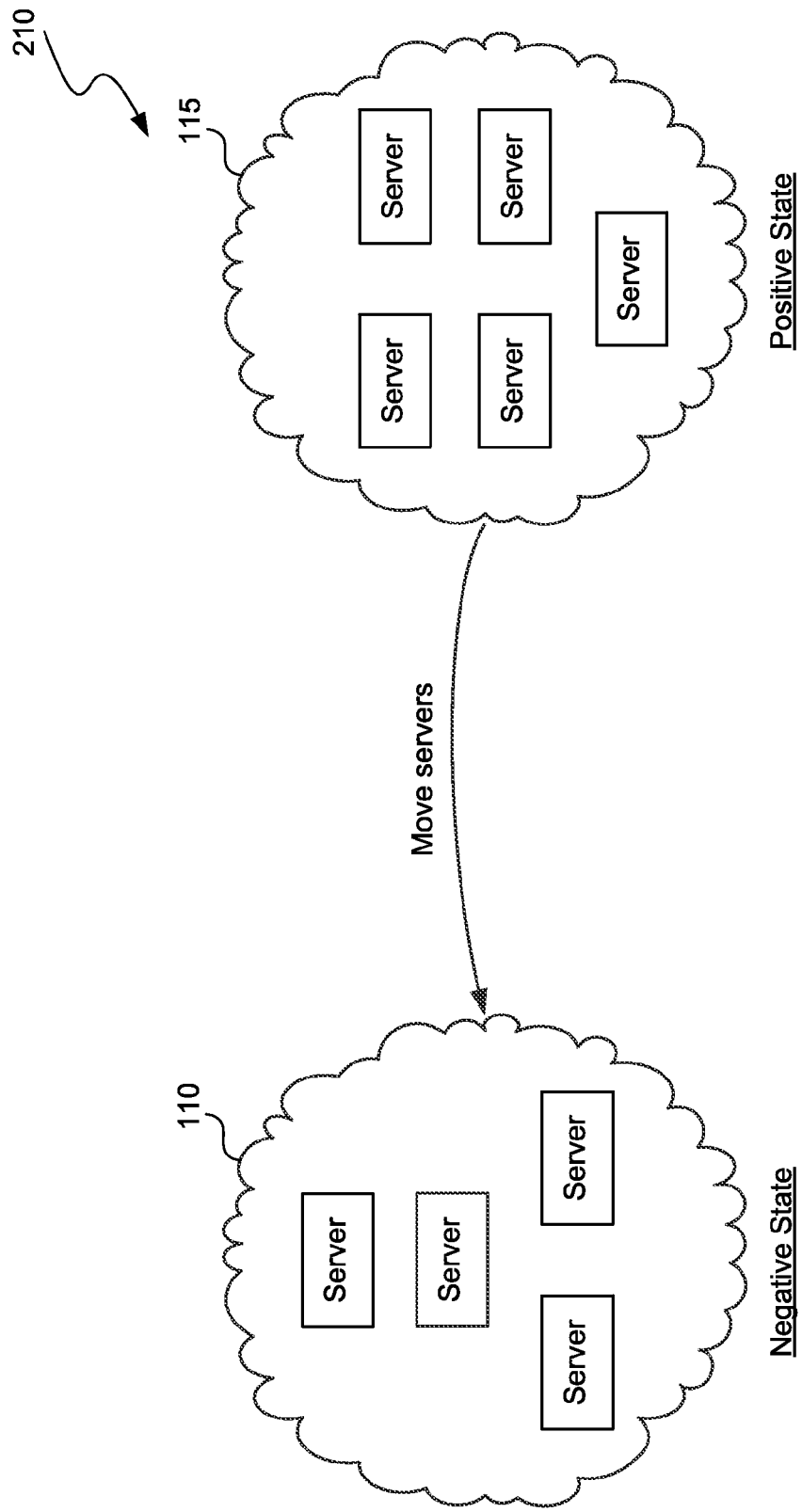
FIG. 2B is a block diagram of an example of moving servers from the second pool to the first pool, consistent with various embodiments.

FIG. 2B is a block diagram of an example 210 of moving servers from the second pool 115 to the first pool 110, consistent with various embodiments. In the example 210, the load balancing server 120 determines that the first pool 110 is in the negative state, e.g., during day when more clients are accessing the desktop version of the social networking application than the mobile version. Further, in the example 210, the load balancing server 120 determines that the second pool 115 is in the positive state, e.g., an average response latency of a server in the second pool 115 does not exceed a specified latency threshold even if a specified number of servers are moved from the second pool 115. The load balancing server 120 can then determine to move the specified number of servers from the second pool 115 to the first pool 110. After the servers are moved to the first pool 110, the first pool 110 can switch to a positive state, e.g., the average response latency of a server in the first pool 110 drops to below the specified latency threshold.

Figure 2C:
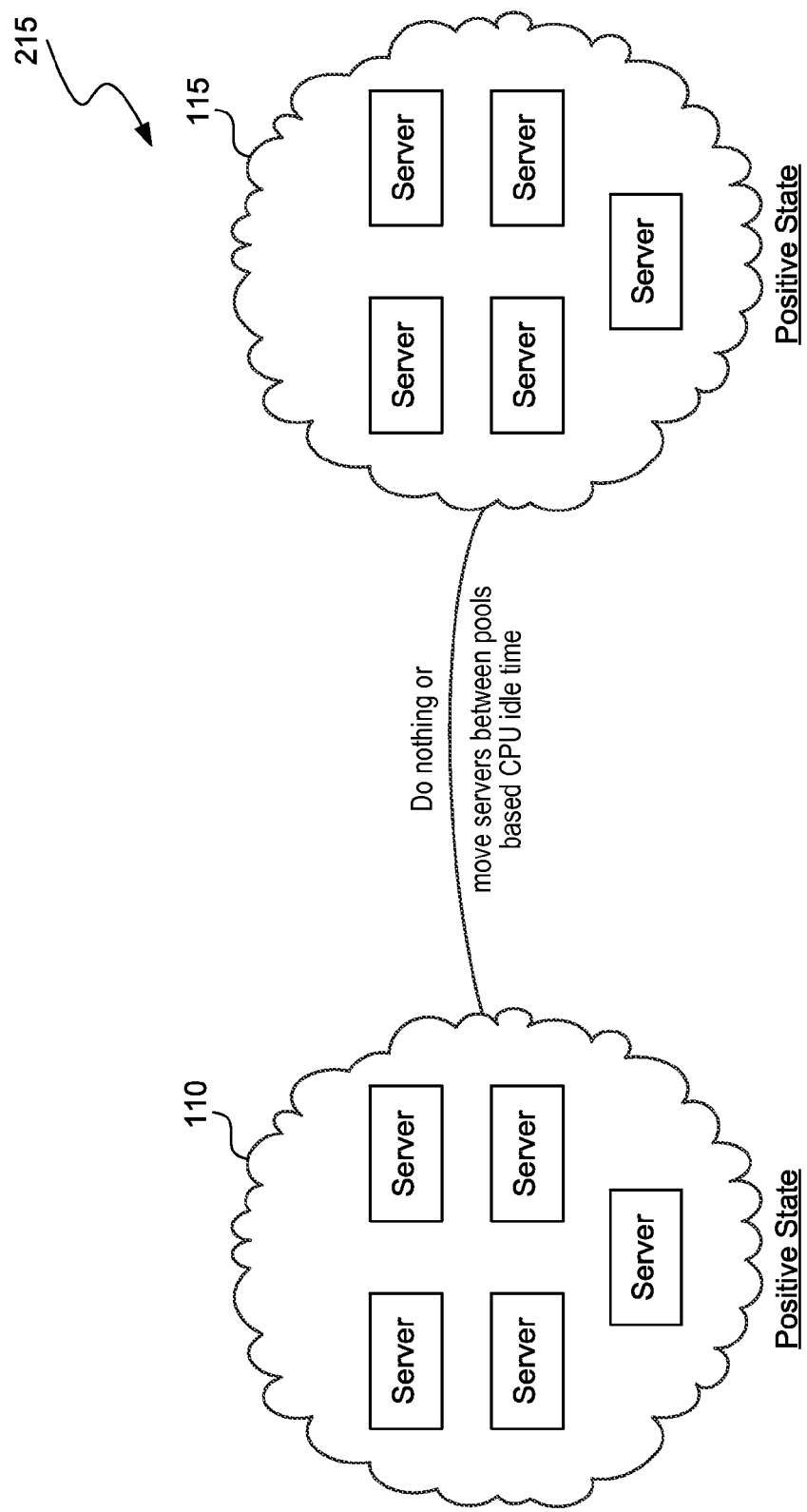
FIG. 2C is a block diagram of an example illustrating various actions that could be performed by a load balancing server of FIG. 1 when both the first pool and the second pool are in a positive state, consistent with various embodiments.

FIG. 2C is a block diagram of an example 215 illustrating actions performed by the load balancing server 120 when both the first pool 110 and the second pool 115 are in the positive state, consistent with various embodiments. In the example 215, the load balancing server 120 determines that the first pool 110 and the second pool 115 are in the positive state. The load balancing server 120 can perform one or more actions when both the pools are in positive state. In one example, the load balancing server 120 can determine not to move any servers between the first pool 110 and the second pool 115. In another example, the load balancing server 120 can determine whether to move servers between the pools based on a particular metric of the server, a host at which the server is executing and/or a pool at which the server is located, e.g., central processing unit (CPU) idle time of the host at which the server is executing. The load balancing server 120 can analyze the CPU idle time of the host at which the server is executing, and determine to move servers from the pool that has highest CPU idle time, e.g., pool in which the hosts are among top 10 percentile of the CPU idle time, to a pool that has lower CPU idle time.

Figure 2D:
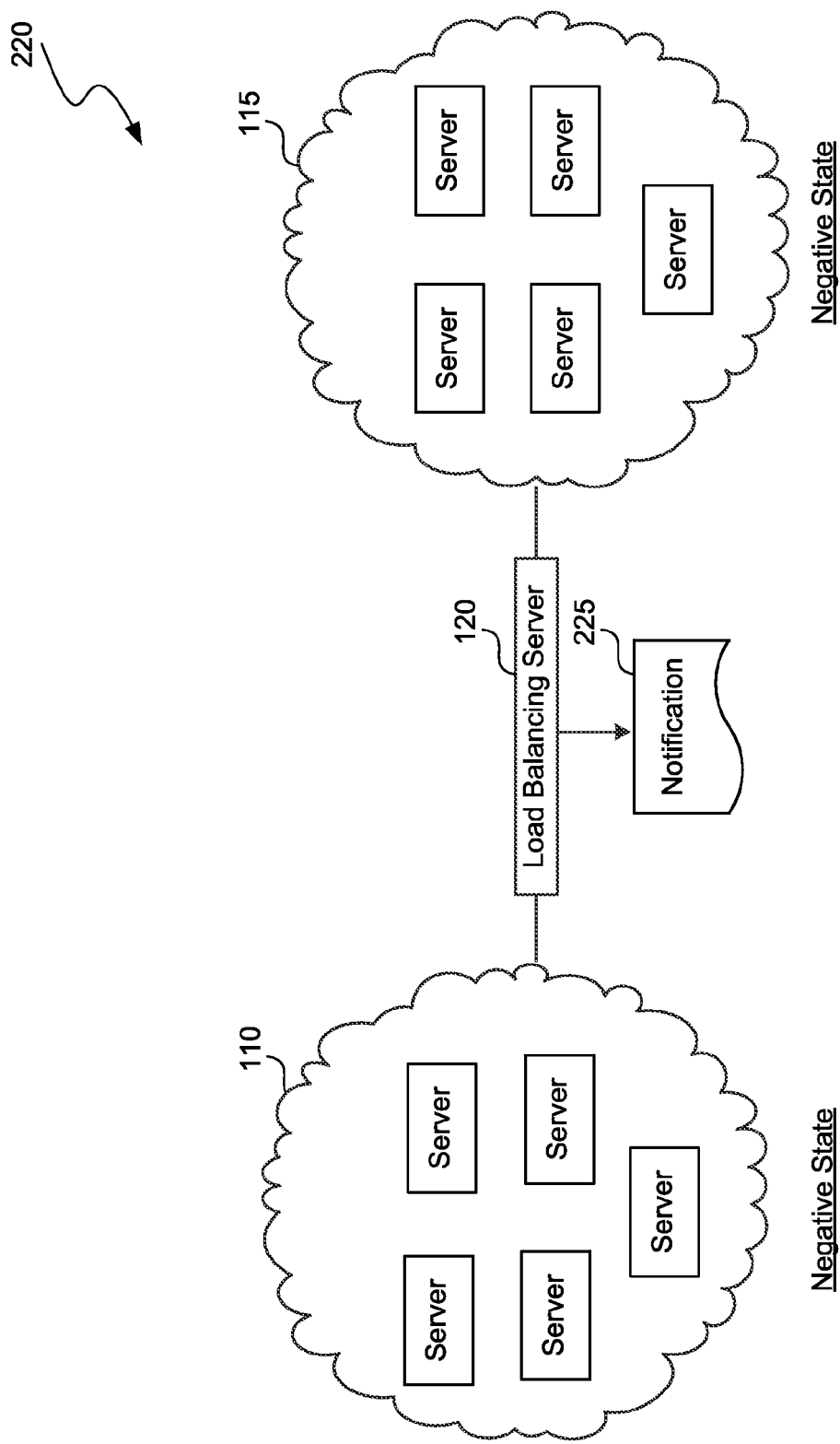
FIG. 2D is a block diagram of an example illustrating actions performed by the load balancing server when both the first pool and the second pool are in the negative state, consistent with various embodiments.

FIG. 2D is a block diagram of an example 220 illustrating actions performed by the load balancing server 120 when both the first pool 110 and the second pool 115 are in the negative state, consistent with various embodiments. In the example 220, the load balancing server 120 determines that the first pool 110 and the second pool 115 are in the negative state. The load balancing server 120 can determine that the load between the pools may not be balanced with existing resources as both pools are overloaded. In some embodiments, the load balancing server 120 generates a notification 225 indicating that both the pools are overloaded. The load balancing server 120 can then send the notification 225 to a user, e.g., an administrator of the distributed computing system 105. The notification 225 can include various details regarding the state of the pools, e.g., performance metrics such as response latency of the servers in the pools; remedial measures such as installing additional servers in each of the pools to alleviate the response latency; number of servers to be installed in each of the pools.

Figure 3:
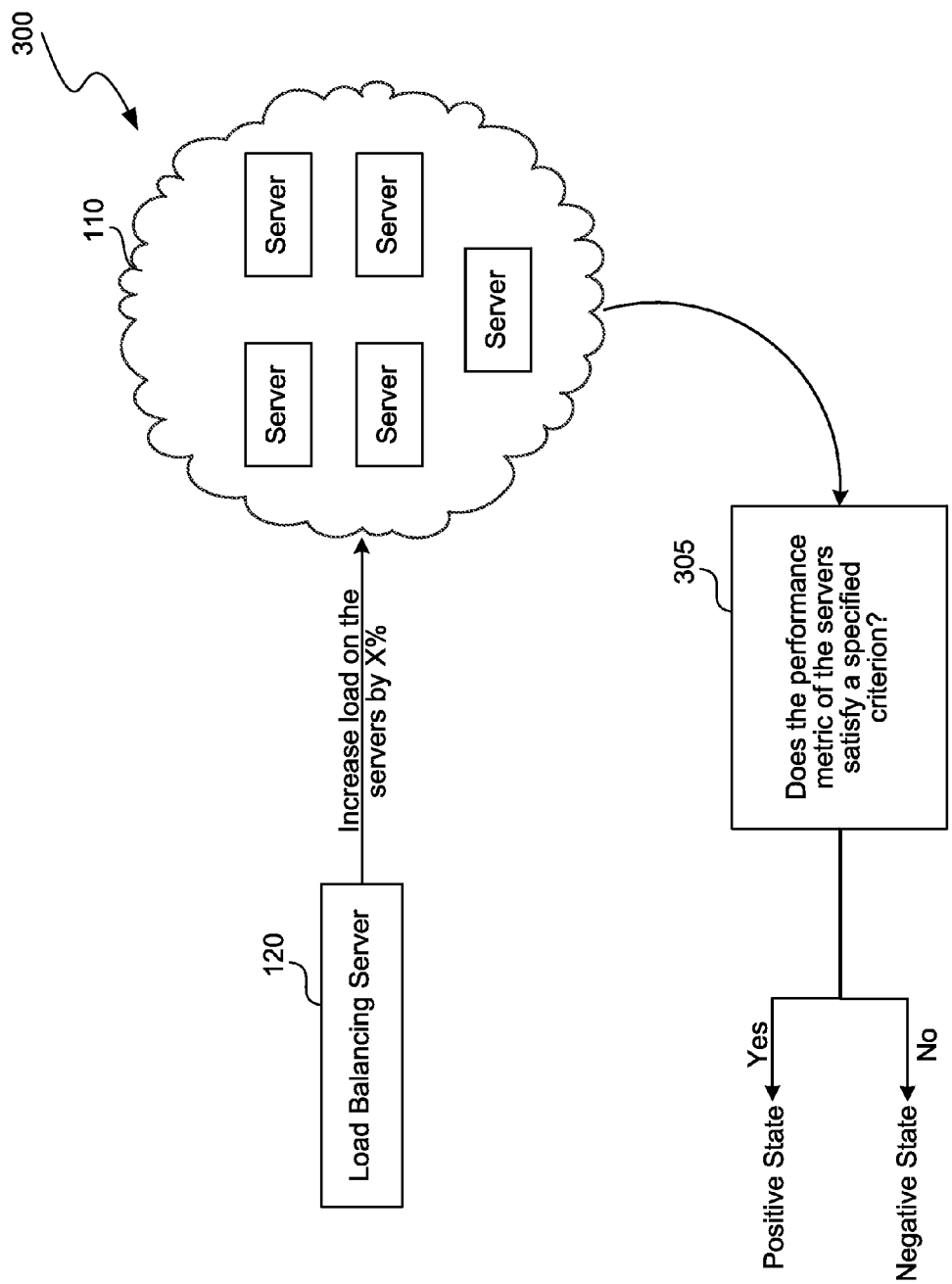
FIG. 3 is a block diagram illustrating determination of a state of a pool of servers in a distributed computing system of FIG. 1, consistent with various embodiments.

FIG. 3 is a block diagram illustrating determination of a state of a pool of servers in a distributed computing system of FIG. 1, consistent with various embodiments. The load balancing server 120 can balance the load between the pools by moving resources, e.g., servers, from a positive pool to a negative pool. In order to move the servers to a negative pool, the load balancing server 120 may have to determine which of the pools is in the positive state and would continue to be in the positive state even if a specified number of servers are moved from the pool.

The load balancing server 120 can determine whether a pool, e.g., the first pool 110, would be in a positive state even after the specified number of servers is moved in many ways. For example, the load balancing server 120 predicts a performance metric of the server and/or pool for a specified load and determines whether the pool, e.g., the first pool 110, is in the positive state or in the negative state based on the predicted performance metric. In some embodiments, the load balancing server 120 increases a load on the first pool 110, e.g., by a specified percentage above the current load of the pool (or current average load per server of the first pool 110), and analyzes a performance metric of the server and/or the pool to determine whether the first pool 110 is in the positive state or in the negative state. The load balancing server 120 determines whether the performance metric satisfies a specified criterion (block 305). If the performance metric satisfies the specified criterion, the load balancing server 120 determines that the first pool 110 is in a positive state. On the other hand, if the performance metric does not satisfy the specified criterion, the load balancing server 120 determines that the first pool 110 is in a negative state.

For example, the load balancing server 120 determines whether an average response latency of a server in the first pool 110 exceeds a specified latency threshold with the increased load. If the average response latency of a server in the first pool 110 does not exceed the specified latency threshold, the load balancing server 120 determines that the first pool 110 is in positive state. However, if the average response latency of the server exceeds the specified latency threshold, the load balancing server 120 determines that the first pool 110 is in negative state.

In some embodiments, the load balancing server 120 can increase the load on the servers in the first pool 110 by increasing a number of requests sent to the servers in the first pool 110. In some embodiments, the load balancing server 120 can generate new requests, e.g., similar to the requests received at the servers from clients 191, and send the new requests to the servers for the purpose of measuring the performance metrics of the first pool 110.

Figure 4A:
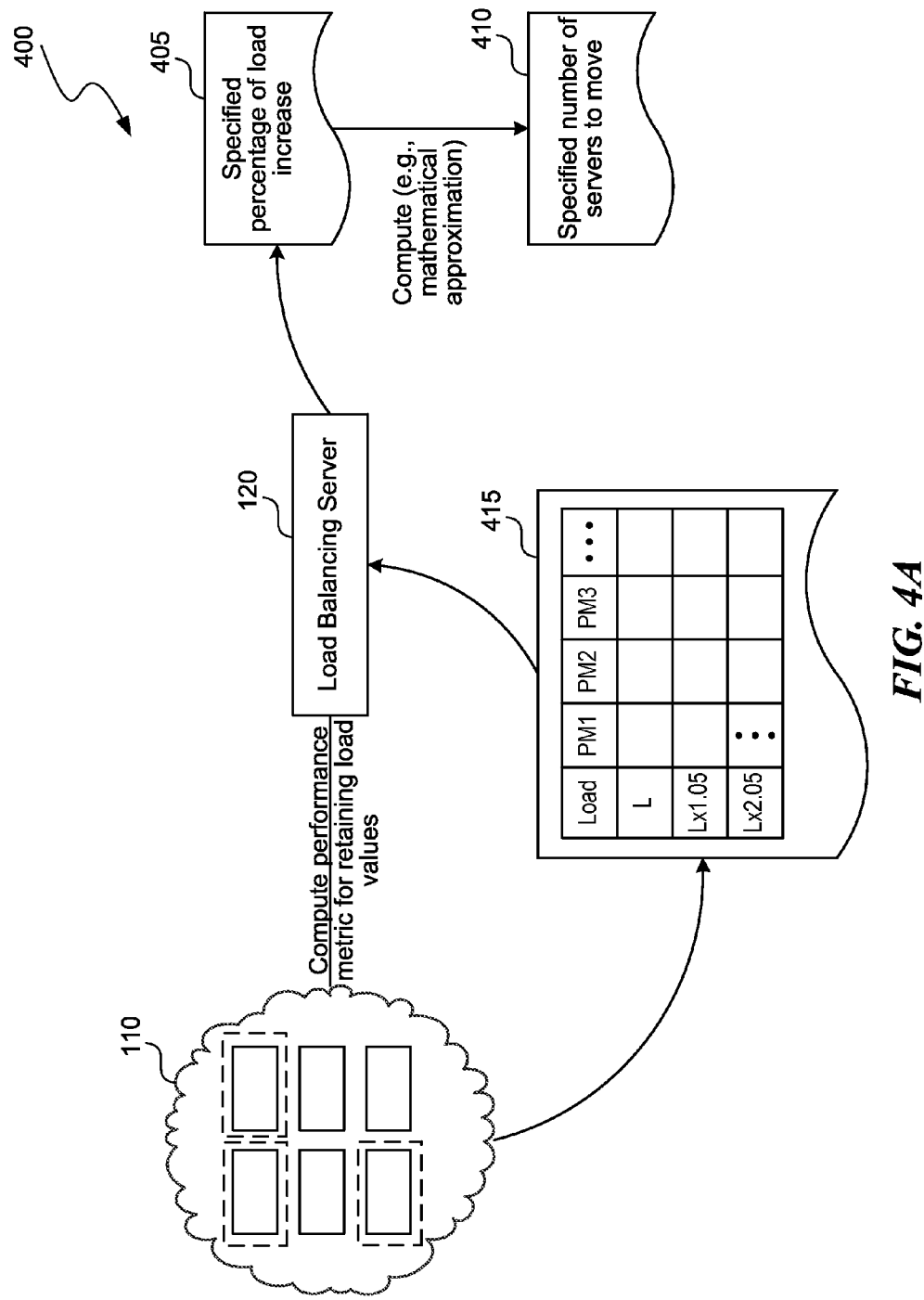
FIG. 4A is a block diagram for determining a specified number of servers to be moved from one pool to another pool, consistent with various embodiments.
Figure 4B:
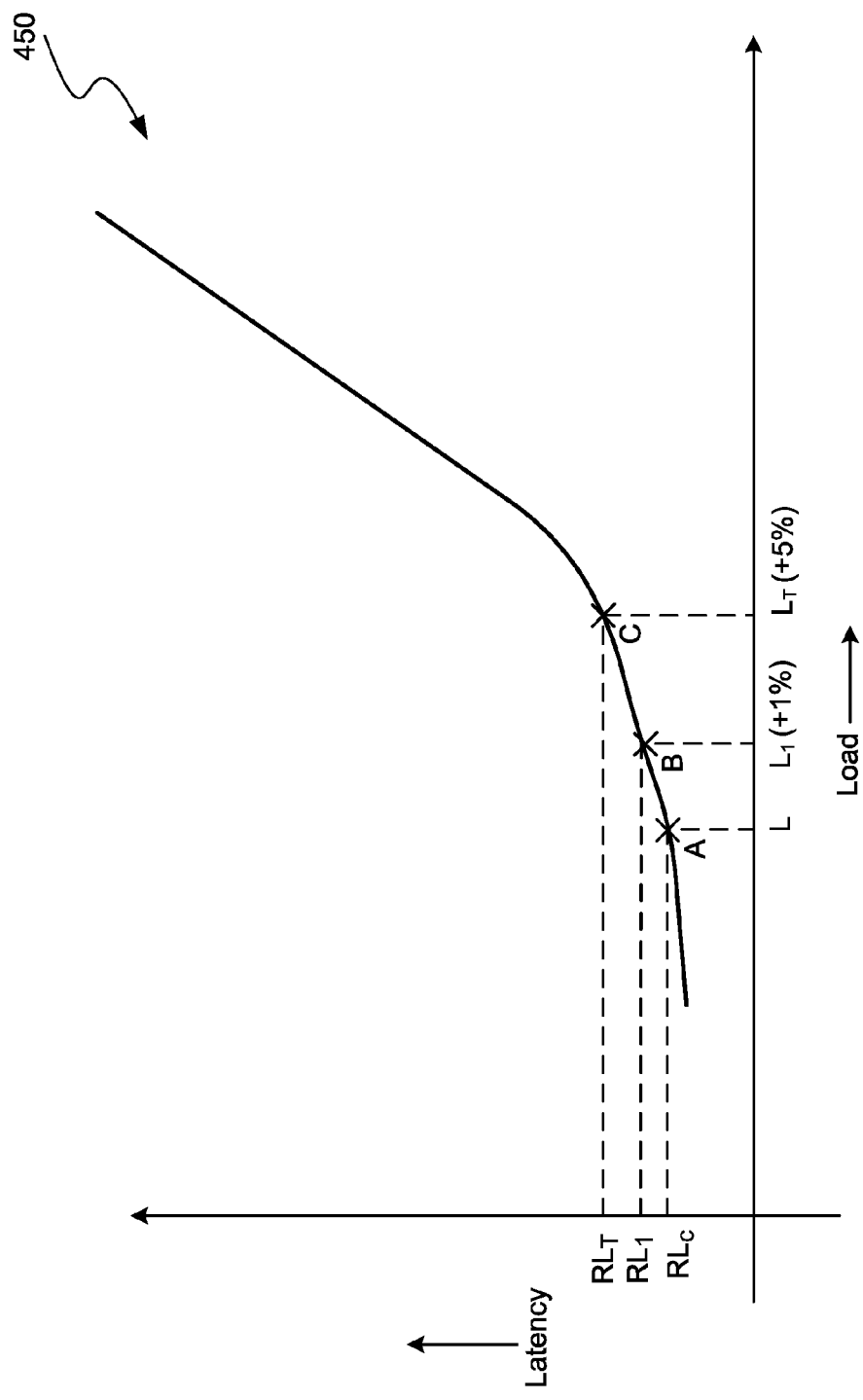
FIG. 4B is a graph illustrating a relation between the load of a server and response latency of the server for the load, consistent with various embodiments.

FIGS. 4A and 4B, collectively referred to as FIG. 4, is a block diagram for determining a specified number of servers to be moved from one pool to another pool, consistent with various embodiments. As described above at least with reference to FIG. 3, the load balancing server 120 increases the load on the servers in the pool by a specified percentage 405 above the current load of the pool and determines whether the pool is in positive state at the increased load. In some embodiments, the load balancing server 120 determines the specified number of servers 410 to be moved from a pool, e.g., from the first pool 110, as a function of the specified percentage 405 by which the load balancing server 120 increased the load, e.g., for performance metric measurement purposes.

In some embodiments, the load balancing server 120 uses statistical data, e.g., a performance metrics table 415, that includes performance metrics of the first pool 110 for various values of the load on the servers to determine the specified number of servers 410. For example, if "L" is the average current load per server in the first pool 110, the performance metrics table 415 can include response latencies of the first pool 110 for various incremental values of the load, such as "L," "L*1.01" (which is "1%" above the current load), and "L*1.05" (which is "5%" above the current load). The load balancing server 120 can analyze the response latencies for various load values, and select any of the load values for which the corresponding response latency is below the specified latency threshold.

FIG. 4B is a graph 450 illustrating a relation between the load of a server in the pool and response latency of the server for the load, consistent with various embodiments. In the graph 450, the load on a server in a pool, e.g., the first pool 110, is plotted on the x-axis and the response latency of the server is plotted in the y-axis. The co-ordinate "A" indicates the current load, "L" and the current response latency, "$RL_C$," co-ordinate "B" indicates the load, "$L_1$," and the response latency, "$RL_1$," at "1%" above the current load, and the co-ordinate "C" indicates the response latency threshold, "$RL_T$," and the load, "$L_T$," at the response latency threshold, which in the graph 450 is equal to "5%" above the current load. Note that after a specified range of load values, the response latency increases exponentially, e.g., beyond the load, "$L_T$." The load balancing server 120 can select any of the load values for which the response latency is below the specified latency threshold.

Referring back to FIG. 4A, after selecting a specified load value, the load balancing server 120 determines the specified number of servers 410 to be moved as a function of the specified percentage 405 which the selected load is above the current load. The function can be a mathematical approximation function that approximates the specified percentage 405 to the specified number of servers. In some embodiments, the specified percentage 405 approximates to the same percentage of servers to be moved. For example, if the load balancing server 120 selected the load value "$L_1$," which is "1%" above the current load, the mathematical approximation function can determine the specified number of servers 410 to be moved is "1%" of the servers in the first pool 110.

In some embodiments, the load balancing server 120 moves a smaller number of servers than a larger number of servers though the first pool 110 can remain in positive state even if the larger number of servers are moved, e.g., to avoid any unexpected catastrophes, which can include crashing of the servers, unexpected sudden surge in the number of requests from clients 191 of the first pool 110, etc.

The performance metrics table 415 can be computed in many ways. In some embodiments, the load balancing server 120 selects a set of servers in the first pool 110, increases the load on the set of servers in various increments above the current load until the response latency of the set of servers exceed the specified latency threshold. The load balancing server 120 records the values of the response latencies for the various load values in the performance metrics table 415. The load balancing server 120 can update the performance metrics table 415 based on an event, e.g., at regular intervals, when the response latency of any of the pools exceed a specified threshold latency. Further, the performance metrics table 415 can be generated either by the load balancing server 120 or other components, e.g., third-party applications.

Figure 5:
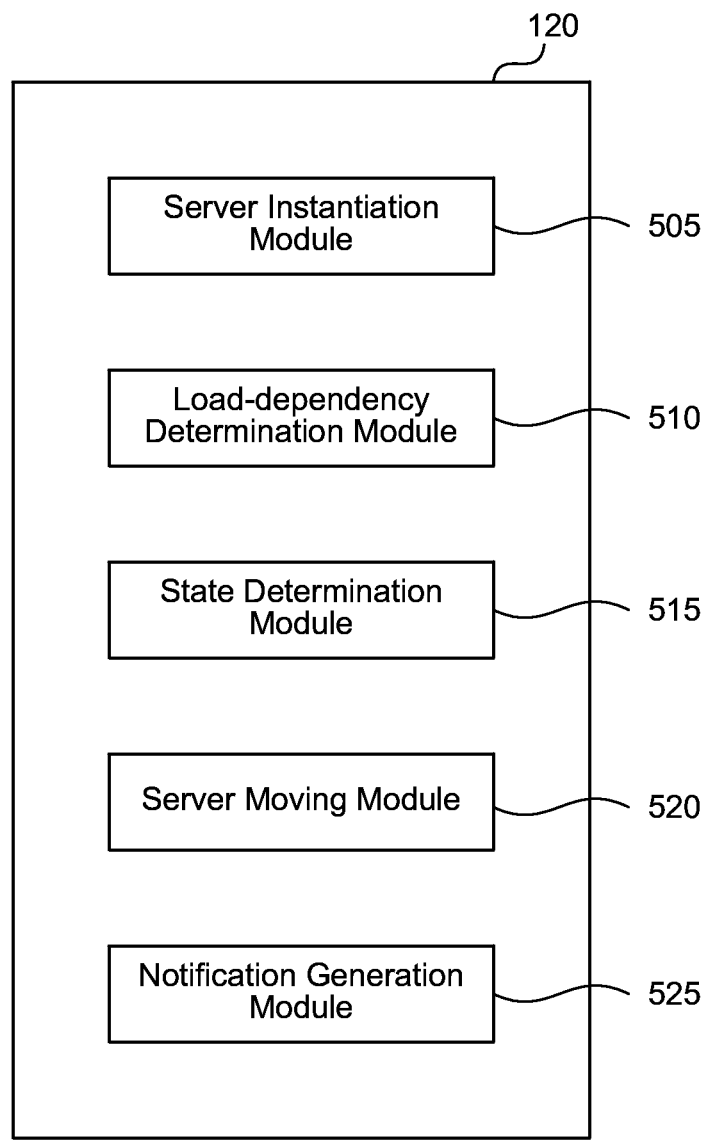
FIG. 5 is a block diagram of the load balancing server of FIG. 1, consistent with various embodiments.

FIG. 5 is a block diagram of the load balancing server of FIG. 1, consistent with various embodiments. The load balancing server 120 includes a server instantiation module 505 that can be configured to execute instances of servers, e.g., the first server 130, the fourth server 180, which are instances of an application, e.g., social networking application. The server instantiation module 505 instantiates a server at a physical computing device, e.g., the first host 125. The server instantiation module 505 instantiates servers of different types in different pools, e.g., instantiates a desktop version of the social networking application in the first pool 110, and instantiates a mobile version of the social networking application in the second pool 115. The server instantiation module 505 instantiates a server at a physical computing device, e.g., the first host 25.

The load balancing server 120 includes a load-dependency determination module 510 that can be configured to predict various performance metrics, e.g., response latency of a server, for various load values on the server, e.g., at least as described with reference to FIG. 4. In some embodiments, the load-dependency determination module 510 generates statistical data, e.g., the performance metrics table 415, used for determining the number of servers to be moved from a pool.

The load balancing server 120 includes a state determination module 515 to determine a state of a pool of servers, e.g., positive state or negative state. In some embodiments, the state determination module 515 determines the state of a pool at least as described with reference to FIG. 3.

The load balancing server 120 includes a server moving module 520 to move servers from one pool to another pool, e.g., from a positive state pool to a negative state pool. In some embodiments, the server moving module 520 interacts with the state determination module 515 to determine the state of a pool and with the load-dependency determination module 510 to determine the number of servers to be moved. In some embodiments, the server moving module 520 moves the servers from one pool to another pool at least as described with reference to FIGS. 1 and 2.

The load balancing server 120 includes a notification generation module 525 that can be configured to generate a notification, e.g., notification 225 of FIG. 2, when two or more pools, e.g., the first pool 110 and the second pool 115, are in the negative state. In some embodiments, the notification generation module 525 generates the notification at least as described with reference to FIG. 2. The notification generation module 525 can also be configured to send the notification to a user, e.g., an administrator of the distributed computing system 105.

Additional details with respect to the modules of the load balancing server 120 are described at least with reference to FIG. 6 below. Note that the load balancing server 120 illustrated in FIG. 5 includes five modules. However, the number of modules in the load balancing server 120 is not restricted to the above modules. The load balancing server 120 can include lesser number of modules, e.g., functionalities of two modules can be combined into one module, or can include more number of modules, e.g., additional modules that perform other functionalities.

Figure 6:
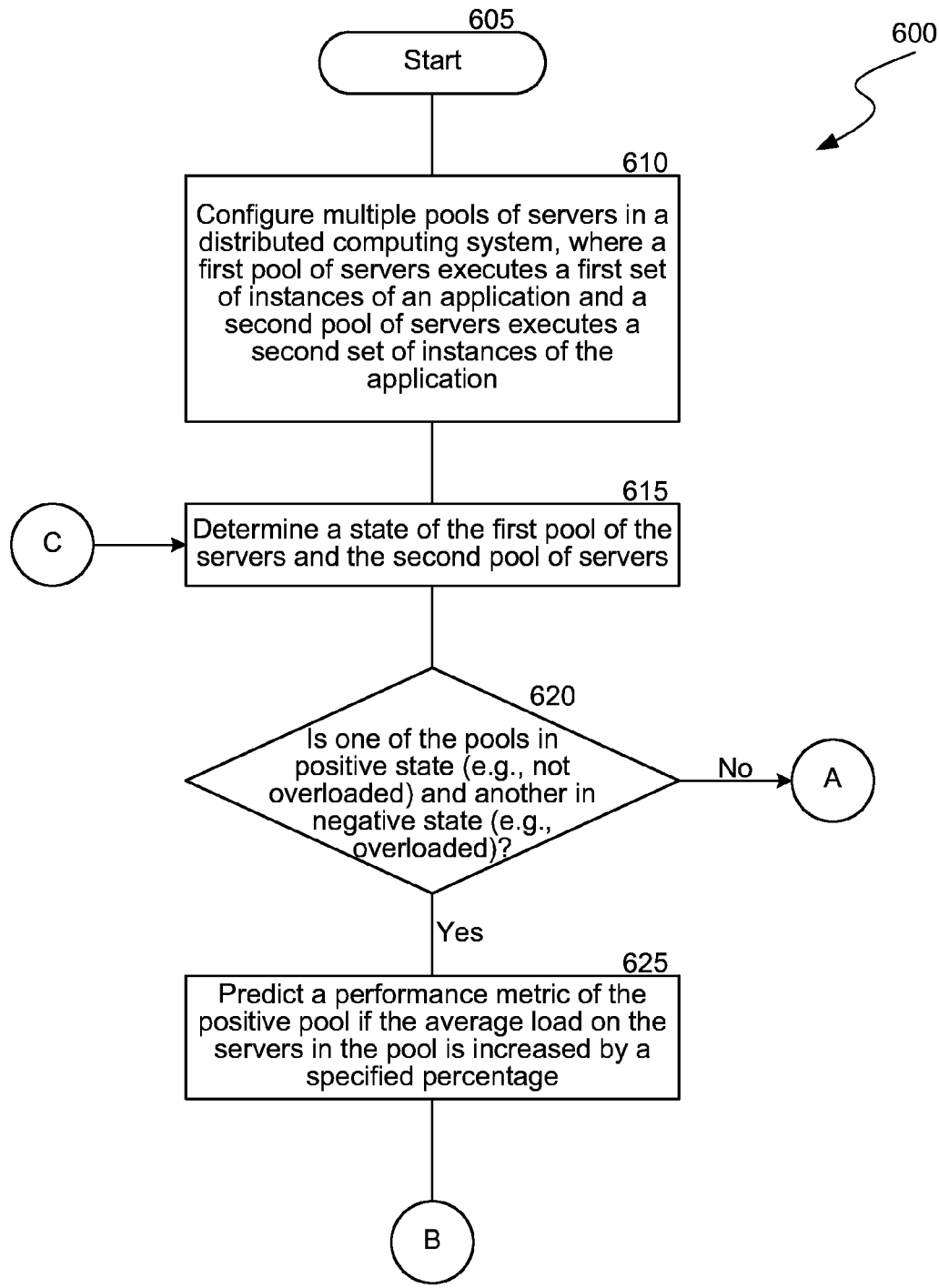
FIG. 6 is a flow diagram of a process of balancing resources between pools of servers in the distributed computing system of FIG. 1, consistent with various embodiments.
Figure 6:
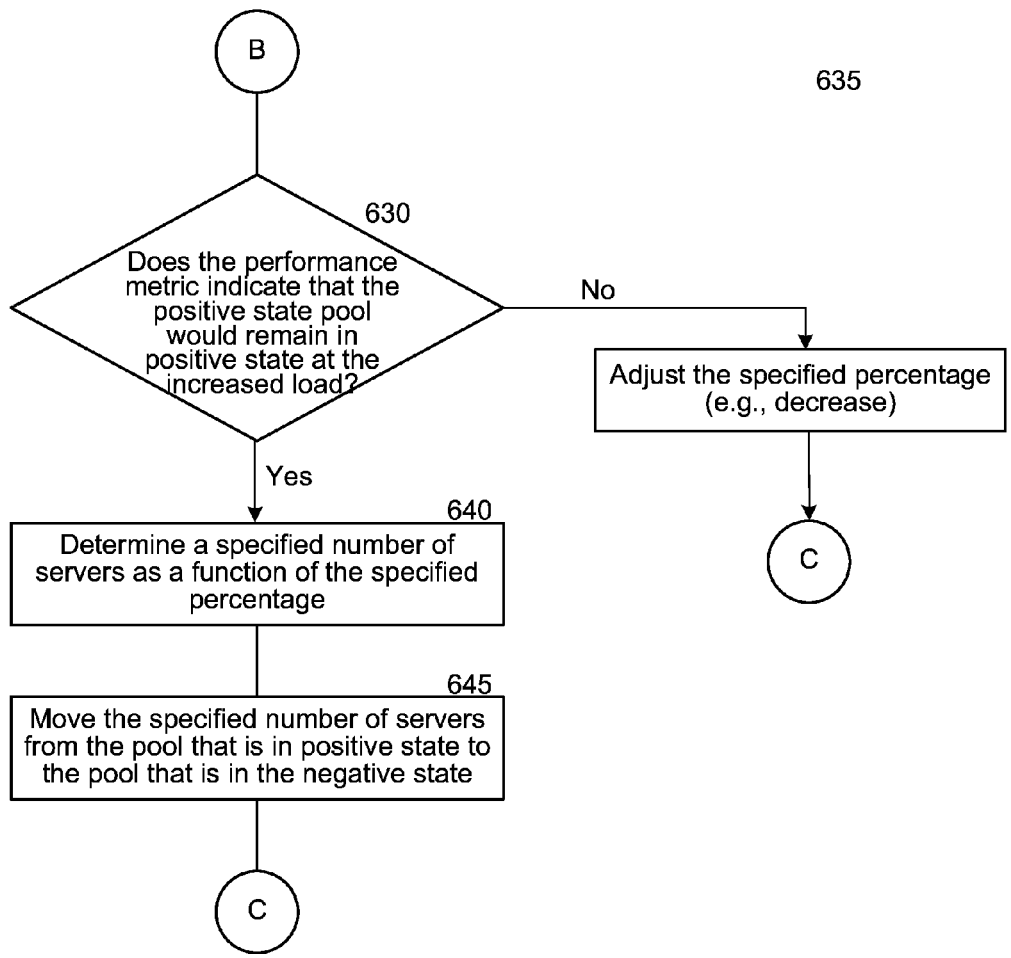
Figure 6:
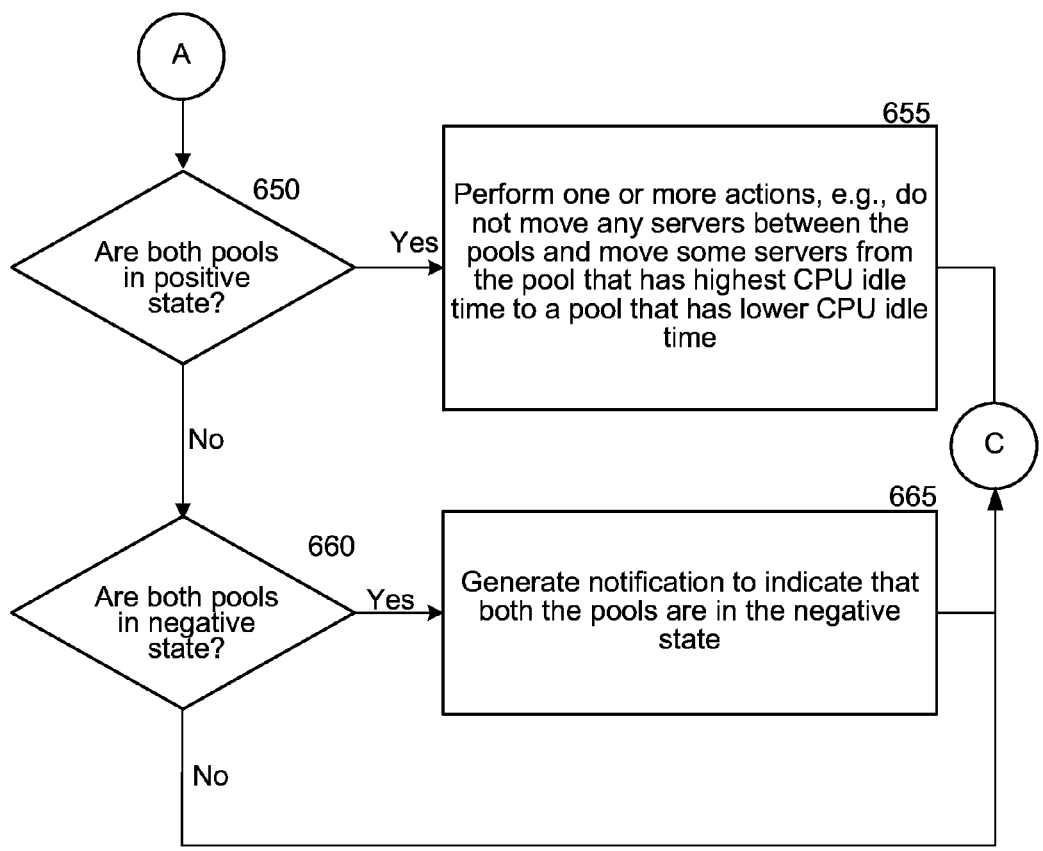

FIG. 6 is a flow diagram of a process 600 of balancing resources in a distributed computing system of FIG. 1, consistent with various embodiments. The process 600 may be executed in in the environment 100 of FIG. 1. The process 600 begins at block 605, and at block 610, the server instantiation module 505 instantiates multiple pools of servers in the distributed computing system. For example, the server instantiation module 505 instantiates a first pool of servers 110 corresponding to a first set of instances of an application, e.g., desktop version of a social networking application, and a second pool of servers 115 corresponding to a second set of instances of the application, e.g., mobile version of the social networking application.

At block 615, the state determination module 515 determines a state of the pools, e.g., the first pool 110 and the second pool 115. In some embodiments, the state determination module 515 determines the state of the pools as described at least with reference to FIG. 3. A pool of servers can have two or more states, e.g., a positive state and a negative state. In some embodiments, a pool is said to be in a negative state if a performance metric of the pool does not satisfy a specified criterion, e.g., response latency exceeds a specified threshold. In some embodiments, a pool is said to be in a positive state if a performance metric of the pool does satisfies a specified criterion, e.g., response latency is below a specified threshold even if a specified number of servers are removed from the pool.

At determination block 620, the state determination module 515 determines if one of the pools of servers is in a positive state and another pool is in a negative state. If one of the pools of servers is in a positive state and another pool is in a negative state, at block 625, the load-dependency determination module 510 predicts, for servers in the positive pool, values of one or more performance metrics for one or more load values on the server, e.g., at least as described with reference to FIG. 4. For example, the load-dependency determination module 510 predicts a response latency of a server in the positive pool for a selected load value that is greater than the current load on the server by a specified percentage.

At determination block 630, the state determination module 515 determines if the predicted performance metric indicates that the pool would remain in the positive state at the increased load. For example, the load-dependency determination module 510 determines if the predicted response latency for specified percentage of load is below a specified threshold. If the predicted response latency exceeds the specified threshold, i.e., the state determination module 515 indicates that the pool would not remain in the positive state, at block 635, the load-dependency determination module 510 adjusts the load value, e.g., decreases the load value. On the other hand, if the state determination module 515 indicates that the pool would remain in the positive state at the selected load value, at block 640, the server moving module 520 determines the number of servers to be removed from the positive pool, which can then be moved to the negative pool. In some embodiments, the server moving module 520 determines the number of servers to be moved as a function of the specified percentage by which the selected load value is greater than the current load.

At block 645, the server moving module 520 moves the servers from the positive pool to the negative pool, e.g., at least as described with reference to FIGS. 1 and 2.

Referring back to determination block 620, if the state determination module 515 determines the condition of block 620 yields a false value, at determination block 650, the state determination module 515 determines if both the pools are in positive state. If both the pools are in positive state, at block 655, the server moving module 520 performs one or more actions, e.g., either does not move any servers between the pools or moves a specified number of servers from a pool that has highest percentile of CPU idle time to another pool that has lower percentile of CPU idle time.

If both the pools are not in positive state, at block 660, the state determination module determines if both the pools are in negative state. If both the pools are in negative state, at block 665, the notification generation module 525 generates a notification indicating that both the pools are in negative state, and the process 600 continues to block 615 to continue monitoring the state of the pools. In some embodiments, the notification is transmitted to a user, e.g., an administrator of the distributed computing system 105. The notification can either be displayed on a displayed device or sent to the user via email, text message, etc.

Figure 7:
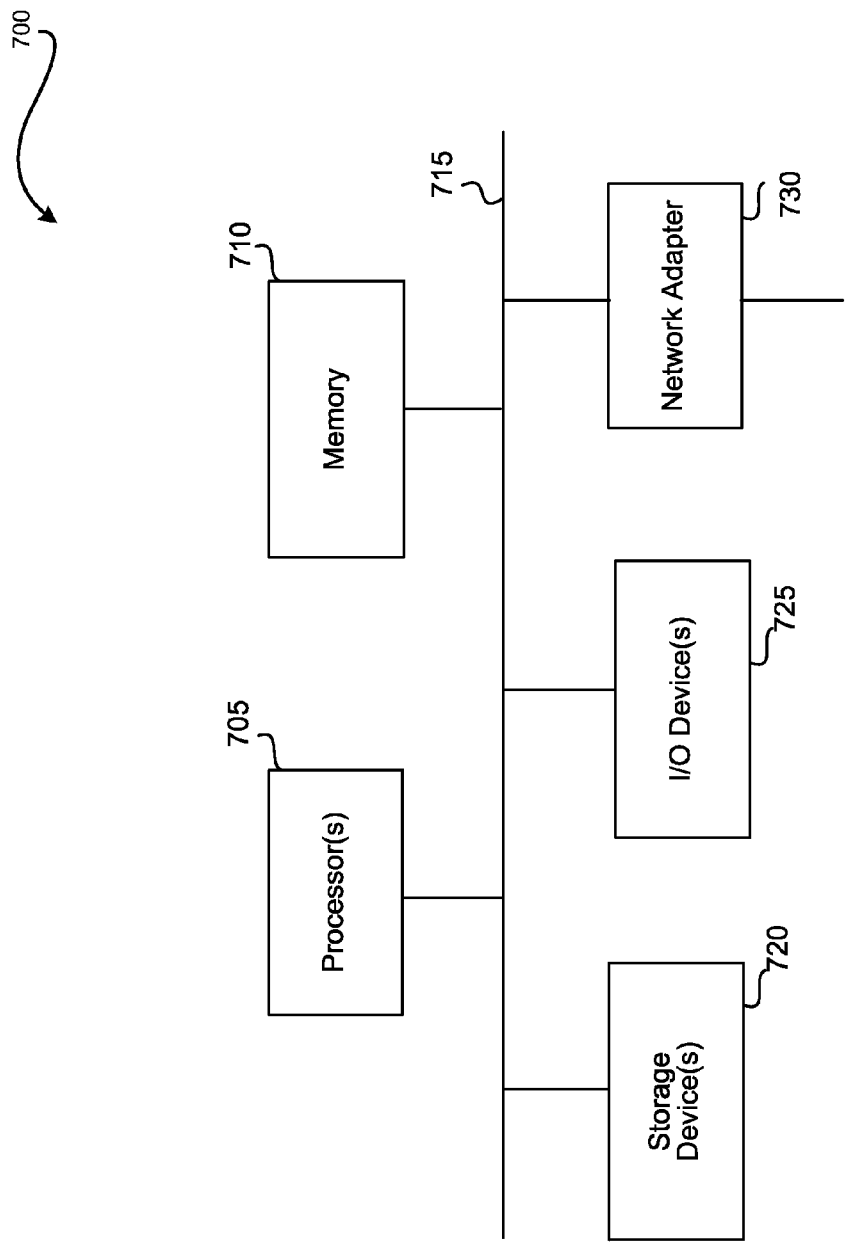
FIG. 7 is a block diagram of a processing system that can implement operations of the present invention.

FIG. 7 is a block diagram of a computer system as may be used to implement features of some embodiments of the disclosed technology. The computing system 700 may be used to implement any of the entities, components or services depicted in the examples of FIGS. 1-6 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising: executing multiple pools of servers in a distributed computing system, the pools of servers including: a first pool of servers executing multiple instances of a first version of an application, and a second pool of servers executing multiple instances of a second version of the application; determining that the first pool is in a positive state and the second pool is in a negative state as a function of a load of servers in the corresponding pool; predicting a response latency of the first pool of servers if the load of servers in the first pool is increased by a specified percentage above a current load of servers, wherein the predicting the response latency includes: progressively increasing a load of the first pool of servers in a number of increments to generate multiple response latency values corresponding to the increments, the load increased until one of the multiple response latency values exceeds a specified threshold, selecting a specified response latency value from the multiple response latency values that are below the specified threshold, identifying the specified percentage above the current load to which the specified response latency value corresponds, and determining a specified number of servers to be moved from the first pool to the second pool, wherein the specified number is determined as a particular percentage of a total number of servers in the first pool, wherein the particular percentage is determined as a mathematical approximation of the specified percentage; and moving the specified number of servers from the first pool to the second pool, wherein the moving causes the second pool to switch to a positive state.

2. The method of claim 1, wherein determining that the first pool is in the positive state includes determining that a performance metric of the first pool of servers satisfies a specified criterion even after the specified number of servers are moved from the first pool.

3. The method of claim 2, wherein the performance metric includes a response latency of the first pool of servers.

4. The method of claim 1, wherein moving the specified number of servers from the first pool to the second pool includes: terminating execution of instances of the first version of the application on the specified number of servers, and executing instances of the second version of the application on the specified number of servers.

5. The method of claim 1, wherein executing the multiple pools of servers includes: receiving a request at the distributed computing system from a client computing device to access the first version of the application, and responding to the request by a server from the first pool of servers.

6. The method of claim 5, wherein receiving the request for accessing the first version of the application includes receiving the request for accessing a non-mobile version of the application.

7. The method of claim 1, wherein executing the multiple pools of servers includes: receiving a request at the distributed computing system from a client computing device to access the second version of the application, and responding to the request by a server from the second pool of servers.

8. The method of claim 7, wherein receiving the request for accessing the second version of the application includes receiving the request for accessing a mobile version of the application.

9. A non-transitory computer-readable storage medium storing computer-readable instructions, comprising: instructions for executing multiple pools of servers in a distributed computing system, the pools including: a first pool of servers executing a first set of instances of an application, and a second pool of servers executing a second of set of instances of the application; instructions for determining a current load of a pool of servers of the pools of servers; current load of the pool of server—is increased by a specified percentage; instructions for determining a state of the pool of servers as a positive state if the performance metric satisfies a specified criterion or as a negative state if the performance metric does not satisfy the specified criterion; instructions for predicting a response latency of the first pool of servers if the current load of servers in the first pool is increased by a specified percentage, wherein the predicting the response latency includes: progressively increasing a load of the first pool of servers in a number of increments to generate multiple response latency values corresponding to the increments, the load increased until one of the multiple response latency values exceeds a specified threshold, selecting a specified response latency value from the multiple response latency values that are below the specified threshold, identifying the specified percentage above the current load to which the specified response latency value corresponds and instructions for determining, a specified number of servers to be moved from the first pool to the second pool as a particular percentage of a total number of servers in the first pool, wherein the particular percentage is determined as a mathematical approximation of the specified percentage.

10. The computer-readable storage medium of claim 9, wherein the instructions for determining the state of the pool of servers further includes: instructions for determining that the first pool is in the positive state and the second pool is in the negative state; and instructions for moving the specified number of servers from the first pool to the second pool.

11. The computer-readable storage medium of claim 10, wherein the instructions for moving the specified number of servers from the first pool to the second pool includes: instructions for terminating execution of the first set of instances of the application on the specified number of servers, and instructions for executing the second set of instances of the application on the specified number of servers.

12. The computer-readable storage medium of claim 10, wherein the instructions for moving the specified number of servers from the first pool to the second pool further includes: instructions for determining that the first pool is in the negative state and the second pool is in the positive state, and instructions for moving a second specified number of servers from the second pool to the first pool.

13. The computer-readable storage medium of claim 9, wherein the instructions for determining the state of the pool of servers includes: instructions for determining that the first pool is in the negative state and the second pool is in the negative state, and instructions for generating a notification to notify a user that the first pool and the second pool are in negative state.

14. A system, comprising: a processor; a first module configured to execute multiple pools of servers in a distributed computing system, the pools of servers including: a first pool of servers executing multiple instances of a first version of an application, and a second pool of servers executing multiple instances of a second version of the application; a second module configured to determine that the first pool is in a positive state and the second pool is in a negative state, the second module configured to determine based on a performance metric of each of the first pool and the second pool, the performance metric being a function of load of servers in the corresponding pool; a third module to predict the response latency of the first pool of servers if the load of servers in the first pool is increased by a specified percentage above a current load of servers, wherein the third module is configured to predict the response latency by: progressively increasing a load of the first pool of servers in a number of increments to generate multiple response latency values corresponding to the increments, the load increased until one of the multiple response latency values exceeds the specified threshold, selecting a specified response latency value from the multiple response latency values that are below the specified threshold, and identifying the specified percentage above the current load to which the specified response latency value corresponds; a fourth module configured to determine a specified number of servers to be moved from the first pool to the second pool as a particular percentage of a total number of servers in the first pool, wherein the particular percentage is determined as a mathematical approximation of the specified percentage; and a fifth module configured to move a specified number of servers from the first pool to the second pool, wherein the moving causes the second pool to switch to a positive state.

15. The system of claim 14, wherein the fourth further comprising: a fifth nodule is further configured to determine the specified number of servers to be moved as a function of the specified-percentage, the function being the mathematical approximation determined based on statistical data of the performance metric for multiple values of load of servers.

* * * * *